(12) United States Patent
Wiesbauer et al.

(10) Patent No.: US 9,888,331 B2
(45) Date of Patent: Feb. 6, 2018

(54) SYSTEM AND METHOD FOR A TRANSDUCER

(71) Applicant: Infineon Technologies AG, Neubiberg (DE)

(72) Inventors: Andreas Wiesbauer, Poertschach (AT); Christian Jenkner, Klagenfurt (AT); Ulrich Krumbein, Rosenheim (DE); Marc Füldner, Neubiberg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 372 days.

(21) Appl. No.: 14/486,696

(22) Filed: Sep. 15, 2014

(65) Prior Publication Data

US 2016/0080879 A1    Mar. 17, 2016

(51) Int. Cl.
*H04R 29/00*    (2006.01)

(52) U.S. Cl.
CPC ..... *H04R 29/004* (2013.01); *H04R 2201/003* (2013.01)

(58) Field of Classification Search
CPC ................. H04R 29/004; H04R 2201/003
See application file for complete search history.

(56) References Cited

U.S. PATENT DOCUMENTS

| 5,339,285 A | * | 8/1994 | Straw | H04R 17/08 330/258 |
| 2010/0013501 A1 | * | 1/2010 | Van Den Boom | G01D 3/08 324/679 |
| 2014/0103921 A1 | * | 4/2014 | Raman | G01R 33/0023 324/251 |
| 2017/0150253 A1 | * | 5/2017 | Ravnkilde | H04R 3/002 |

FOREIGN PATENT DOCUMENTS

WO    wo 2013/102499    *    7/2013    ............... H04R 3/00

* cited by examiner

*Primary Examiner* — Ping Lee
(74) *Attorney, Agent, or Firm* — Slater Matsil, LLP

(57) ABSTRACT

According to an embodiment, a transducer system includes a transducing element and a symmetry detection circuit. The transducing element includes a signal plate, a first sensing plate, and a second sensing plate. The symmetry detection circuit is coupled to a differential output of the transducer element and is configured to output an error signal based on asymmetry in the differential output.

26 Claims, 8 Drawing Sheets

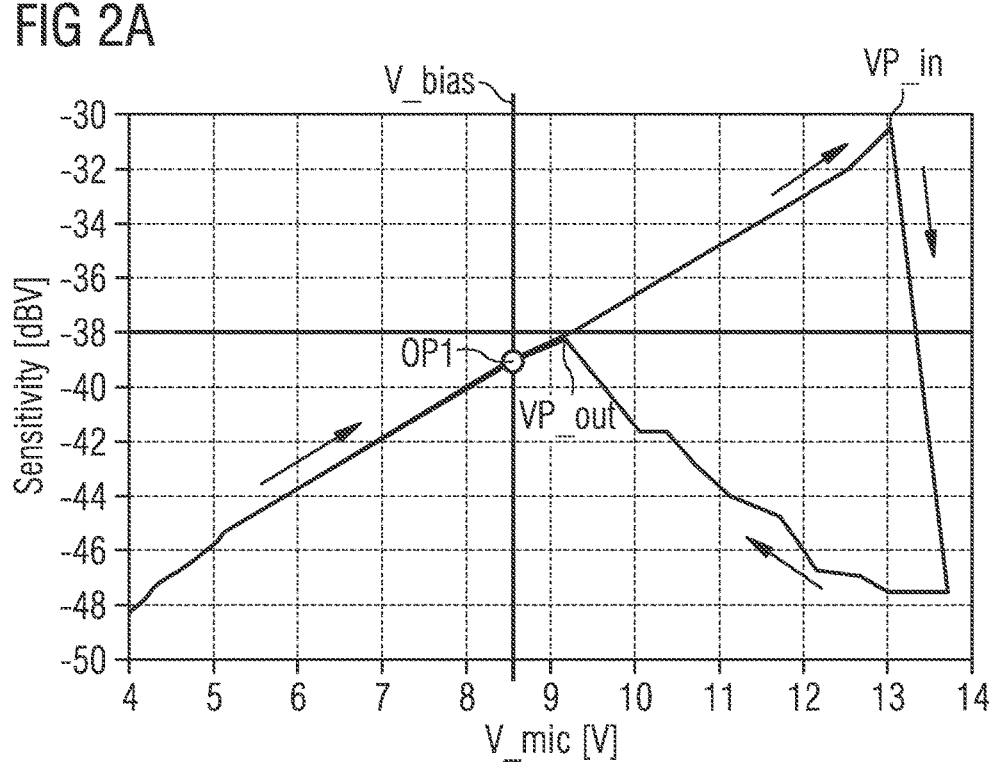
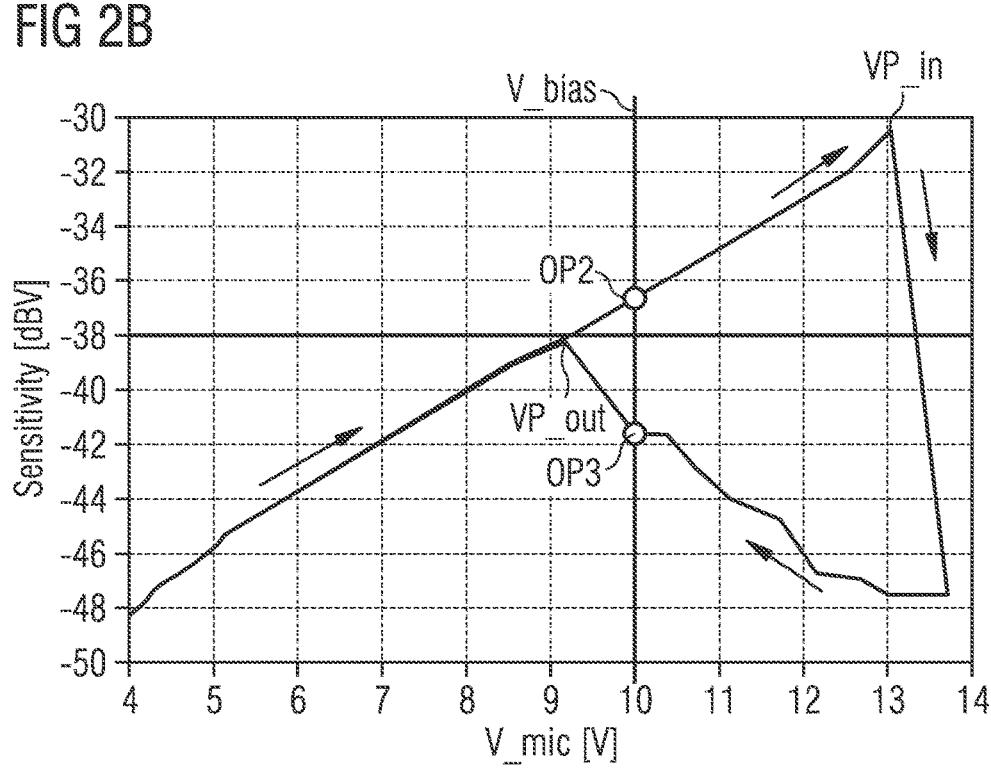

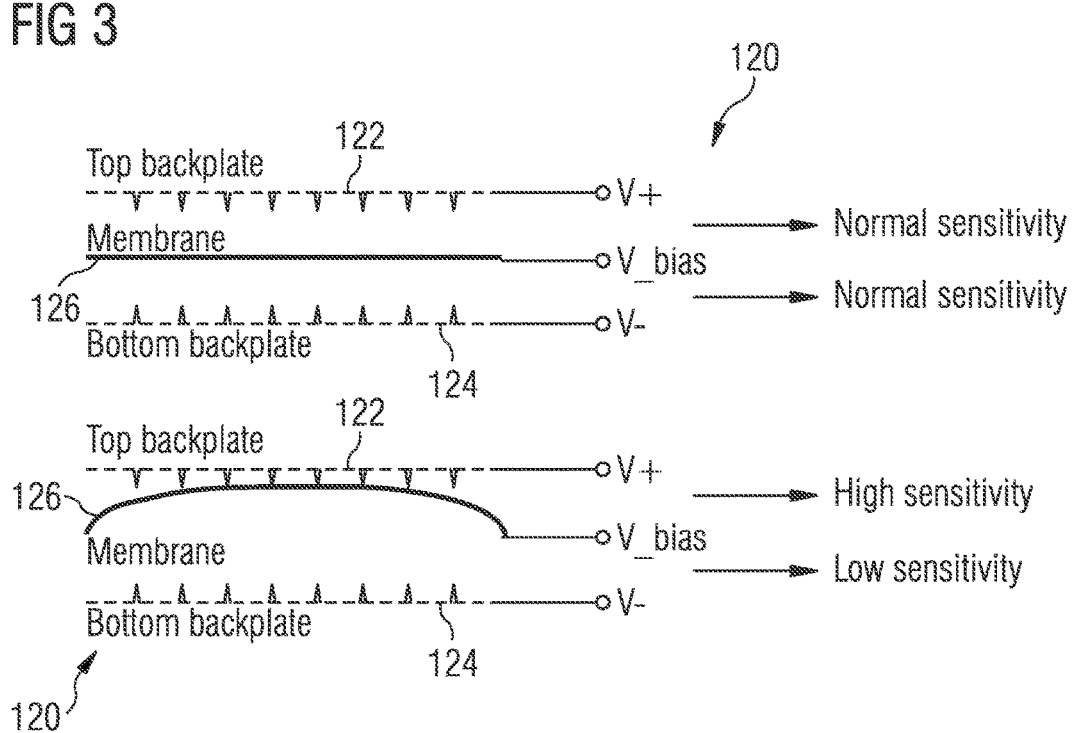

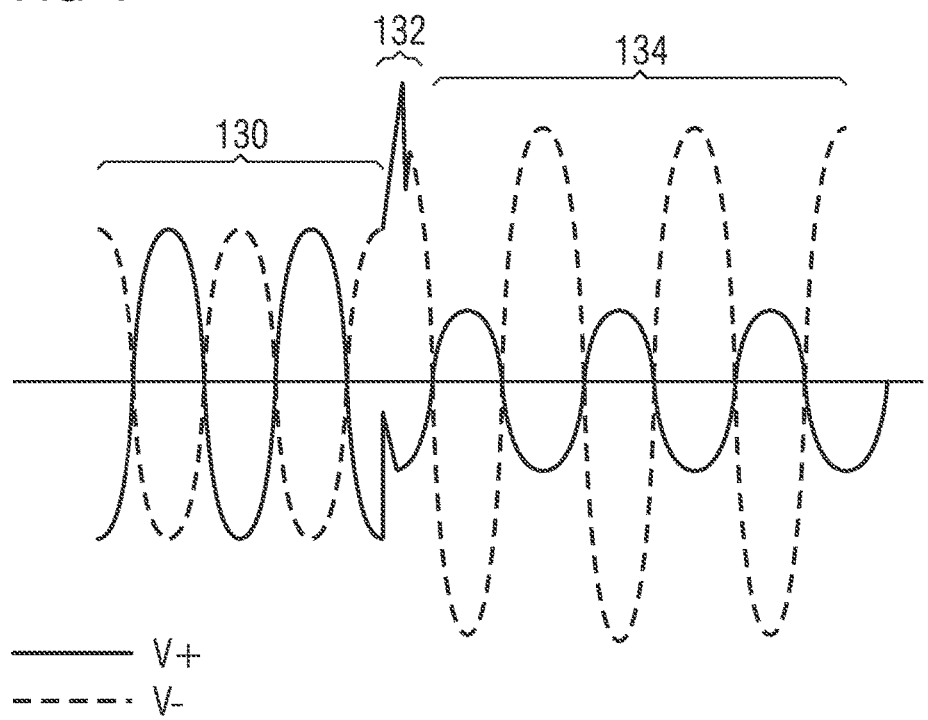
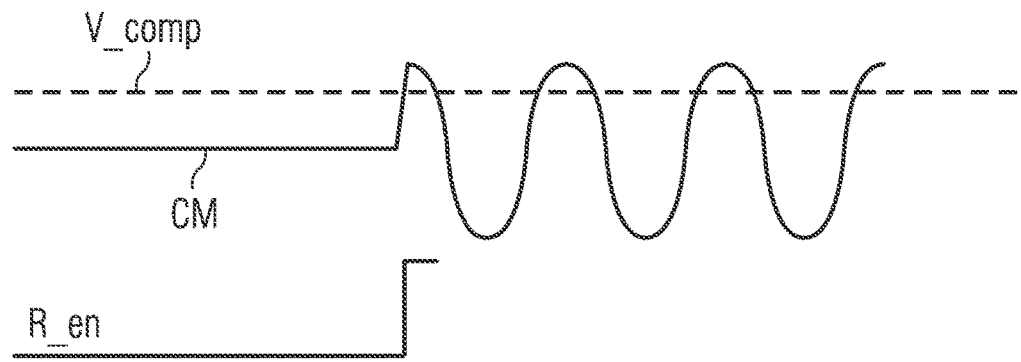

SYSTEM AND METHOD FOR A TRANSDUCER

TECHNICAL FIELD

The present invention relates generally to systems and methods for electronics, and, in particular embodiments, to a system and method for a transducer.

BACKGROUND

Transducers convert signals from one domain to another and are often an integral component in sensors. One common sensor including a transducer that is seen in everyday life is a microphone that converts sound waves to electrical signals.

Microelectromechanical system (MEMS) based sensors include a family of transducers produced using micromachining techniques. MEMS, such as a MEMS microphone, gather information from the environment by measuring the change of physical state in the transducer and transferring a transduced signal to processing electronics that are connected to the MEMS sensor. MEMS devices may be manufactured using micromachining fabrication techniques similar to those used for integrated circuits.

MEMS devices may be designed to function as, for example, oscillators, resonators, accelerometers, gyroscopes, pressure sensors, microphones, and micro-mirrors. Many MEMS devices use capacitive sensing techniques for transducing the physical phenomenon into electrical signals. In such applications, the capacitance change in the sensor is converted to a voltage signal using interface circuits.

One such capacitive sensing device is the MEMS microphone. A MEMS microphone generally has a deflectable membrane separated by a small distance from a rigid backplate. In response to a sound pressure wave incident on the membrane, the membrane deflects towards or away from the backplate, thereby changing the separation distance between the membrane and backplate. Generally, the membrane and backplate are made out of conductive materials and form "plates" of a capacitor. Thus, as the distance separating the membrane and backplate changes in response to the incident sound wave, the capacitance changes between the "plate" and an electrical signal is generated.

For capacitive MEMS sensors, it is possible, in the presence of a large physical signal or shock, for one of the deflectable plates to deflect until contacting an adjacent plate. In such cases, the voltage applied to the plates may be sufficient to cause the plates to remain in contact with one another. This phenomenon may be referred to as "pull-in." In capacitive MEMS sensors, pull-in may affect the performance of the sensor.

SUMMARY

According to an embodiment, a transducer system includes a transducing element and a symmetry detection circuit. The transducing element includes a signal plate, a first sensing plate, and a second sensing plate. The symmetry detection circuit is coupled to a differential output of the transducer element and is configured to output an error signal based on asymmetry in the differential output.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2a and 2b illustrate plots of the sensitivity of the embodiment transducer according to first and second operation scenarios, respectively;

FIG. 3 illustrates a schematic depiction of an embodiment dual backplate transducer exhibiting the pull-in phenomenon;

FIG. 4 illustrates a differential output waveform of the embodiment dual backplate transducer exhibiting the pull-in phenomenon before repair;

FIG. 5 illustrates a waveform diagram of the embodiment dual backplate transducer during operation;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely microphone transducers, and more particularly, MEMS microphones. Some of the various embodiments described herein include, for example, MEMS transducer systems, MEMS microphone systems, dual backplate MEMS microphones, error detection and repair in transducers, and pull-in detection and repair for capacitive MEMS sensors. In other embodiments, aspects may also be applied to other applications involving any type of sensor or transducer according to any fashion as known in the art.

In a capacitive plate transducer, after pull-in caused by shock or large amplitude signals, some plates of the capacitive transducer may remain in contact with one another if the plates are biased with a voltage above the pull-out voltage, where the pull-out voltage is the voltage at which the plates will spontaneously separate after pull-in. According to various embodiments, in a dual sensing plate capacitive transducer, such as a dual backplate MEMS microphone, the sensitivity of each plate and the corresponding differential output is altered by pull-in. Thus, embodiments described herein include a method and circuit to analyze the differential output of a dual sensing plate capacitive transducer, such as a dual backplate MEMS microphone, and identify a pull-in situation. In various embodiments, a repair circuit controls the charge on the affected plates, when pull-in is detected by a pull-in detection circuit, in order to cause the plates exhibiting pull-in to release and the transducer to be returned to an unaffected operating condition. In some embodiments, the dual backplate MEMS microphone is operated with a bias voltage between membrane and both backplates that is above the pull-out voltage. In such embodiments, the dual backplate MEMS microphone is biased with a higher bias voltage, leading to an increased sensitivity, and is repaired by the repair circuit in the case of pull-in.

Figure 1:
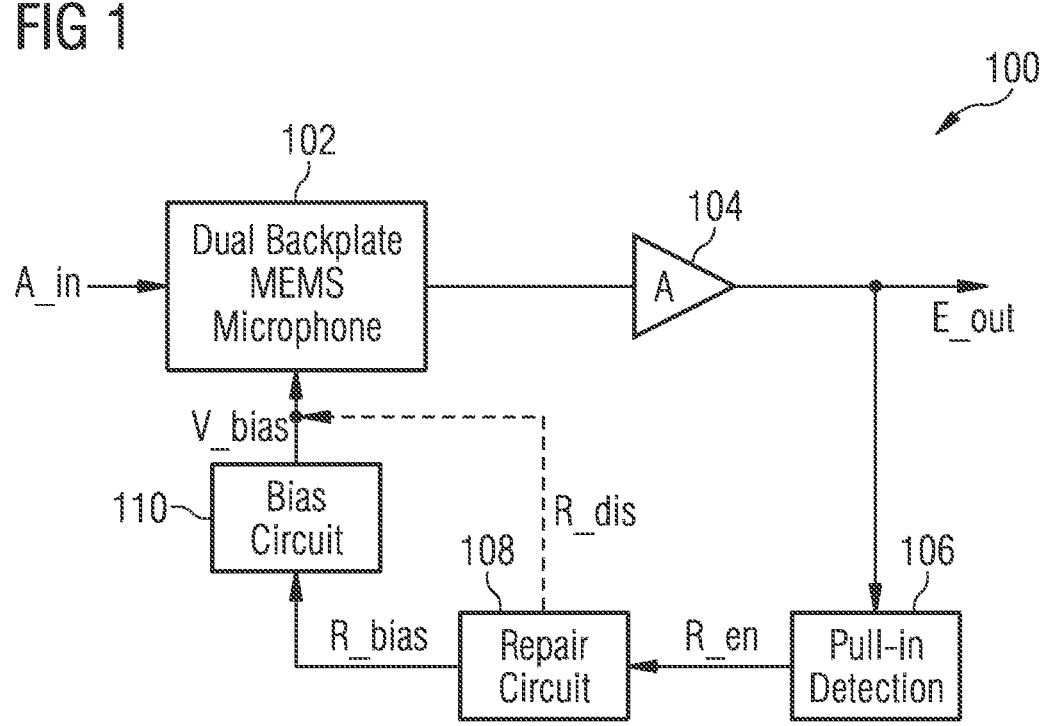
FIG. 1 illustrates a system block diagram of an embodiment transducer system.

FIG. 1 illustrates a system block diagram of an embodiment transducer system 100 including dual backplate MEMS microphone 102, amplifier 104, pull-in detection circuit 106, repair circuit 108, and bias circuit 110. According to various embodiments, MEMS microphone 102 receives an acoustic signal A_in from a sensing environment, such as through a sound port to an ambient environment, and transduces the acoustic signal to supply a differential electrical signal to amplifier 104, which outputs an amplified differential output signal E_out.

In various embodiments, pull-in detection circuit 106 monitors differential output signal E_out during operation of transducer system 100 and supplies release enable signal R_en to repair circuit 108 when pull-in is detected. In some embodiments, pull-in detection circuit 106 may monitor the input of amplifier 104 instead of or in addition to differential output signal E_out. Various specific embodiment pull-in detection circuits and repair circuits are described further herein below. Repair circuit 108 triggers a release or repair sequence that may supply disconnect repair signal R_dis to MEMS microphone 102 in order to disconnect the microphone plates or may supply bias repair signal R_bias to bias circuit 110 in order to alter the bias voltage applied to at least one of the plates of MEMS microphone 102. In various embodiments, the bias voltage V_bias applied to MEMS microphone 102 is above pull-out voltage VP_out during normal operation and below pull-out voltage VP_out during a release or repair sequence.

In various embodiments, other types of differential capacitive plate transducers or sensors may be used in place of MEMS microphone 102, as a dual backplate MEMS microphone is only one example embodiment. For example, some embodiments may include a dual plate accelerometer with pull-in detection circuit 106 and repair circuit 108, as described herein. In another embodiment, a differential output capacitive pressure sensor may include pull-in detection circuit 106 and repair circuit 108, as described herein.

FIGS. 2a and 2b illustrate plots of the sensitivity of the embodiment transducer according to first and second operation scenarios, respectively. The plots depict the sensitivity of the transducer, as shown on the vertical axis, versus the transducer voltage V_mic applied to the transducer plates, as shown on the horizontal axis. The voltages shown include pull-in voltage VP_in and pull-out voltage VP_out. According to various embodiments, FIG. 2a illustrates a first characterization scenario for identifying a first operating point OP1, as set by bias voltage V_bias, which is set below pull-out voltage VP_out.

The sensitivity plots illustrated in FIGS. 2a and 2b are generated in order to characterize the transducer behavior with respect to pull-in and pull out behavior. In order to perform this characterization, a small acoustic signal is applied to the acoustic transducer that causes a small variation in the total displacement distance between the backplate and membrane. The small variation is much less than the total displacement distance. The transducer voltage V_mic is varied and the sensitivity is measured for each voltage. Based on the resulting plot from the first characterization illustrated in FIG. 2a, a first operating point OP1 is determined. First operating point OP1 may guarantee that the membrane will not stick to the backplate following an acoustic shock event. If bias voltage V_bias is set to operate the transducer at first operating point OP1 (below pull out voltage VP_out), although a large acoustic signal may bring the membrane and the backplate in contact, once the large acoustic signal disappears, the membrane returns to its original position.

In various embodiments, as shown in FIGS. 2a and 2b, the sensitivity increases proportionally to the voltage applied to the transducer until pull-in occurs when plates of the transducer make contact with one another. When pull-in occurs, the plates stick together and sensitivity of the transducer decreases substantially because the membrane is no longer free to move. Additionally, the backplate being in contact with the membrane will generate a larger signal compared to the other backplate not in contact with the membrane because of a larger capacitance issuing from the smaller separation distance. As shown in FIG. 2a, because bias voltage V_bias is set below pull-out voltage VP_out, the sticking plates separate and the operation returns to first operating point OP1 following a shock. In such embodiments, the sensitivity of the transducer is the same before and after pull-in occurs because the transducer is operated at first operating point OP1 both before and after pull-in.

FIG. 2b illustrates a second characterization scenario including second and third operating points OP2 and OP3 set by bias voltage V_bias that is above pull-out voltage VP_out. If the transducer is operated at second operating point OP2 by being biased with a larger voltage, i.e., bias voltage V_bias is above pull out, the membrane may remain in contact with the backplate after an acoustic shock event. In such a case, the operating point shifts from second operating point OP2 to third operating point OP3, which results in decreased sensitivity, as shown. As before, following the shock or large amplitude signal, the voltage applied to the plates of the transducer returns to bias voltage V_bias. Because bias voltage V_bias is set above pull-out voltage VP_out, the sticking plates do not separate and the operation moves to third operating point OP3 after the voltage applied to the plates of the transducer returns to bias voltage V_bias. Thus, the sensitivity of the transducer at second operating point OP2, before pull-in occurs, is greater than the sensitivity of the transducer at third operating point OP3, after pull-in occurs, because the transducer is biased above pull-out voltage VP_out and the sticking plates remain in contact. Generally, the first operating point OP1 is chosen with a safety margin such that bias voltage V_bias is somewhat below pull out voltage VP_out in order to prevent operating at third operating point OP3. In various embodiments, by setting biasing voltage V_bias above pull out voltage VP_out, the MEMS transducer generates larger signals with increased sensitivity when operating at operating point OP2. In some embodiments, the signal to noise ratio is increased. For example, the SNR may be increased by up to 8 dB in the embodiment shown FIG. 2. According to various embodiments, described further herein, capacitive plate transducers are biased above the pull-out voltage as shown in FIG. 2b and embodiment detection and repair circuits are configured to detect pull-in and repair the transducer by releasing sticking plates in order to return to the initial operating point, such as second operating point OP2.

FIG. 3 illustrates a schematic depiction of an embodiment dual backplate transducer 120 exhibiting the pull-in phenomenon. Dual backplate transducer 120 includes top backplate 122, bottom backplate 124, and membrane 126. In various embodiments, top backplate 122 is coupled to a first output terminal and exhibits voltage V+, bottom backplate 124 is coupled to a second output terminal and exhibits voltage V−, and membrane 126 is coupled to a bias voltage source, such as bias circuit 110, and is provided with bias voltage V_bias. The upper depiction of dual backplate transducer 120 illustrates membrane 126 in an un-deflected state when membrane 126 does not exhibit the pull-in phenomenon. The lower depiction of dual backplate transducer 120 illustrates membrane 126 in a deflected state when membrane 126 is sticking to top backplate 122 and exhibiting the pull-in phenomenon.

According to various embodiments, in the case where membrane 126 is not sticking, the sensitivity present between membrane 126 and top backplate 122 may be equal to the sensitivity present between membrane 126 and bottom backplate 124 and is at a normal or typical sensitivity level. In the case where membrane 126 is sticking to top backplate 122, the sensitivity present between membrane 126 and top backplate 122 may be at a higher sensitivity level and the sensitivity present between membrane 126 and bottom backplate 124 and is at a lower sensitivity level. Thus, during pull-in, the differential output signal on the first and second output terminals coupled to top backplate 122 and bottom backplate 124, respectively, may be asymmetric because the sensitivity seen at each output is altered inversely during pull-in.

FIG. 4 illustrates a differential output waveform of the embodiment dual backplate transducer 120 exhibiting the pull-in phenomenon before repair. In various embodiments, voltage V+ on the first output terminal and V− on the second output terminal are plotted during normal sound pressure level (SPL) input period 130, during shock period 132, and during normal SPL input period 134 following shock when pull-in has occurred. As shown, voltages V+ and V− are symmetric during normal SPL period 130 before shock. Shock period 132 causes pull-in to occur as described in reference to FIG. 3 above. Following the shock, voltages V+ and V− are asymmetric during normal SPL period 134 due to the pull-in phenomenon asymmetrically altering the capacitance and signal magnitude seen at the first and second output terminals of dual backplate transducer 120. During normal SPL period 134 following pull-in, the signals generated by the sticking plates may be larger than before pull-in as shown during period 130 because the sticking plates have an increased capacitance due to the smaller separation distance between the plates.

In various embodiments, the differential signal including voltages V+ and V− on the first and second output terminals is monitored in order to detect this asymmetric behavior resulting from pull-in. A pull-in detection circuit, such as pull-in detection circuit 106, monitors and identifies the asymmetric variation in the differential output signal and generates a repair or release signal as described above in reference to FIG. 1 and described further herein below.

FIG. 5 illustrates a waveform diagram of the embodiment dual backplate transducer during operation including common mode signal CM and release signal R_en. According to various embodiments, common mode signal CM is generated by monitoring the differential output of a transducer, such as the differential signal including voltages V+ and V− as shown in FIGS. 3 and 4, and determining asymmetric features of the differential output signal. For example, during normal SPL period 130 shown in FIG. 4, common mode signal CM is a constant value, such as zero for example, or a very small signal compared to the single ended signals V+ and V− or the difference between V+ and V− because the voltages V+ and V− are fully symmetric. In some embodiments, common mode signal CM may be 1/10 or 1/100 of the single ended voltage signals V+ and V−, or the difference, when voltages V+ and V− are symmetric. In further embodiments, common mode signal CM may be even smaller than 1/100. During normal SPL period 134 after pull-in occurs, the voltages V+ and V− are asymmetric and the resulting common mode signal CM is not constant, but varies in relation to the asymmetric difference between the voltages. In such embodiments, common mode signal CM is no longer 1/10 or 1/100 of the single ended signals V+ and V−, but instead may be 1/2 of the single ended signals V+ and V−, for example. In one embodiment, common mode signal CM is generated according to the equal CM=((V+)−(V−))÷2. In the various embodiments, voltages V+ or V− may refer to either the unamplified transduced electrical signals output from the transducer or the amplified transduced electrical signals output from the transducer. In other embodiments, common mode signal CM may be generated according to other equations.

In various embodiments, release signal R_en is generated by comparing common mode signal CM to a threshold, such as comparison voltage V_comp. When common mode signal CM exceeds comparison voltage V_comp, release signal R_en is activated as shown in FIG. 5. Release signal R_en may trigger a release or repair sequence that causes the transducer plates to stop sticking. In some embodiments, release signal R_en is triggered based on an absolute value comparison between comparison voltage V_comp and common mode signal CM. Release signal R_en may be filtered in order to prevent spurious triggering of the repair sequence.

Figure 6:
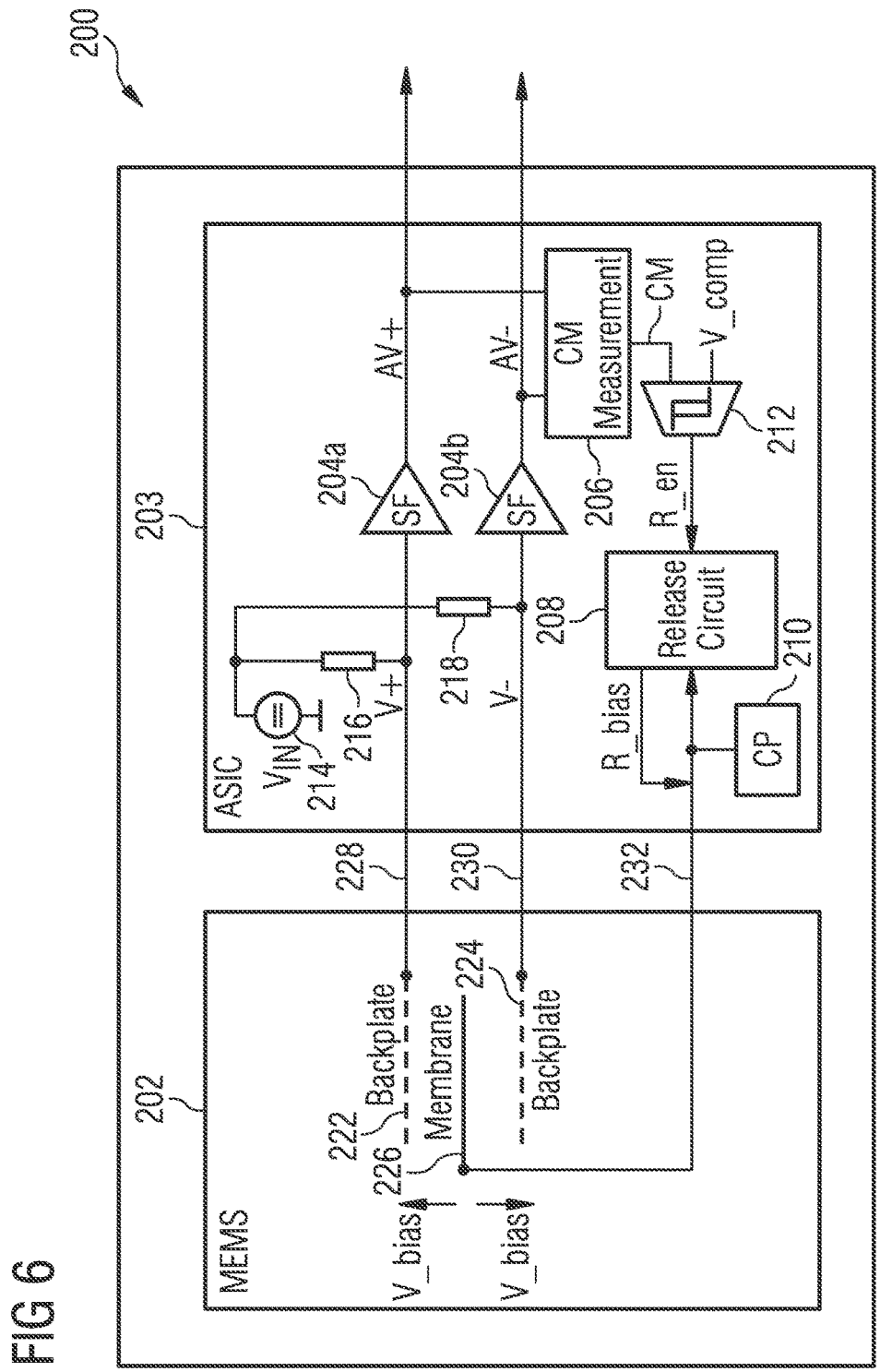
FIG. 6 illustrates a schematic diagram of an embodiment MEMS microphone system.

FIG. 6 illustrates a schematic diagram of an embodiment MEMS microphone system including dual backplate MEMS microphone 202 and application specific integrated circuit (ASIC) 203. According to various embodiments, MEMS microphone 202 receives acoustic signals through a sound port (not shown). The acoustic signals cause deflectable membrane 226 to deflect, altering the parallel plate capacitances between membrane 226 and rigid top backplate 222 and between membrane 226 and rigid bottom backplate 224. The change in capacitance produces a differential signal including voltages V+ and V− on signal lines 228 and 230, which are coupled to ASIC 203. In some embodiments, membrane 226 receives a bias voltage on bias line 232 from charge bump 210 in ASIC 203. The differential signal including voltages V+ and V− may be symmetric, or approximately symmetric, under some operating conditions. Similarly, signal lines 228 and 230 may receive a DC voltage offset from offset voltage source 214, which is coupled to signal lines 228 and 230 through impedance elements 216 and 218, respectively. Bias voltage V_bias may be applied between membrane 226 and top and bottom backplates 222 and 224 by the combination of charge pump 210 and offset voltage source 214.

According to various embodiments, the differential signal including voltages V+ and V− is supplied to amplifiers 204a and 204b in ASIC 203, which outputs an amplified differential signal including voltages AV+ and AV−. The amplified differential signal including voltages AV+ and AV− may be output to a further processor (not shown), such as an audio processor, or any other functional block in various embodiments.

In various embodiments, common mode measurement circuit 206 monitors the amplified differential signal including voltages AV+ and AV− and generates common mode signal CM, as described in reference to FIG. 5. Common mode signal CM is compared to comparison voltage V_comp by comparator 212. Release circuit 208 receives release enable signal R_en from comparator 212 and controls bias voltage V_bias through bias repair signal R_bias based on release enable signal R_en. Release circuit 208 and common mode measurement circuit 206 may each be implemented according to a number of difference embodiments, as described below in reference to FIGS. 7a-8c.

In some embodiments, MEMS microphone 202 may be implemented with two deflectable membranes and a single rigid backplate set between the membranes. In such embodiments, the differential output signal may be generated from connections to the membranes. According to various embodiments, MEMS microphone 202 and the ASIC 203 are implemented on a same wafer or same semiconductor die. In other embodiments, MEMS microphone 202 and the ASIC 203 are implemented on two separate semiconductor dies. In such embodiments, microphone 202 and amplifiers 204a and 204b may be formed on a first semiconductor die while the other components of ASIC 203, excluding amplifiers 204a and 204b, may be implemented on a second semiconductor die. The fabrication of the semiconductor die, either as two separate semiconductor dies or a single integrated product, may be performed according to any fabrication methods known in the art. MEMS microphone 202 and the ASIC 203 may both be fabricated using the same fabrication technology or may be fabricated using separate fabrication technology.

Figure 7A:
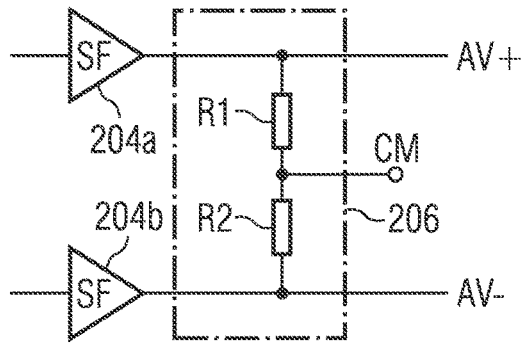
FIGS. 7a, 7b, and 7c illustrate circuit diagrams of embodiment pull-in detection circuits.
Figure 7B:
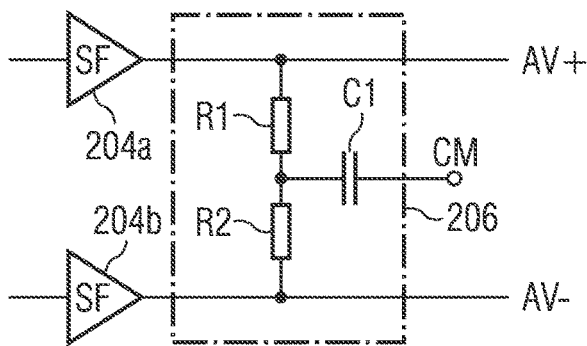
Figure 7C:
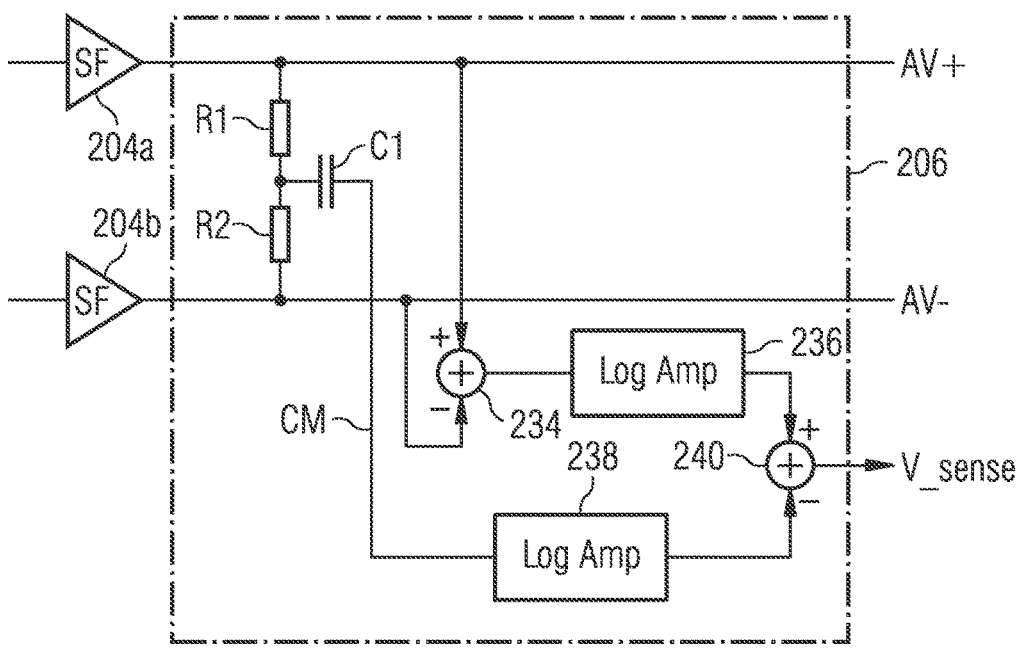

FIGS. 7a, 7b, and 7c illustrate circuit diagrams of embodiment pull-in detection circuits 106 or common mode measurement circuit 206. According to one embodiment, FIG. 7a illustrates pull-in detection circuits 106 or common mode measurement circuit 206 including a resistive divider of resistors R1 and R2 coupled between the outputs of amplifiers 204a and 204b, which output the amplified differential signal including AV+ and AV−. In such embodiments, common mode signal CM is output from the middle node of the resistive divider of resistors R1 and R2.

According to another embodiment, FIG. 7b illustrates pull-in detection circuits 106 or common mode measurement circuit 206 including the resistive divider of resistors R1 and R2 coupled between the outputs of amplifiers 204a and 204b, as in FIG. 7a, but with the addition of output capacitor C1. In such embodiments, common mode signal CM is output from the middle node of the resistive divider of resistors R1 and R2 through capacitor C1.

According to another embodiment, FIG. 7c illustrates pull-in detection circuits 106 or common mode measurement circuit 206 including the resistive divider of resistors R1 and R2 coupled between the outputs of amplifiers 204a and 204b and with the addition of output capacitor C1, but also including logarithmic amplifiers and adder circuits. In such embodiments, common mode measurement circuit 206 operates as a symmetry detection circuit for comparing the output voltages AV+ and AV− in order to detect an asymmetry error.

According to some embodiments, performing symmetry detection may include determining a ratio of the difference between output voltages AV+ and AV− and common mode signal CM. FIG. 7c illustrates one embodiment implementation of using this ratio for symmetry detection. In FIG. 7c common mode signal CM is output from the middle node of the resistive divider of resistors R1 and R2 through capacitor C1, as shown in FIG. 7b, before being supplied to logarithmic amplifier 238. The difference between amplified output voltages AV+ and AV− is calculated in adder 234 and supplied to logarithmic amplifier 236. The difference of the outputs of logarithmic amplifier 236 and logarithmic amplifier 238 is calculated in adder 240 and supplied as the sensing voltage output V_sense. According to one embodiment, sensing voltage output V_sense is given by the logarithmic equation $$V\_sense = \log((AV+)-(AV-))-\log(CM).$$

In other embodiments, sensing voltage output V_sense is proportional to the logarithmic equation. In further embodiments, sensing voltage output V_sense is approximated by the logarithmic equation. In such embodiments, the logarithmic functions may implement the ratio of the output difference and the common mode signal. In some embodiments, an exponential function may be applied to remove the logarithmic function and obtain the true ratio. The sensing voltage output V_sense may be coupled to release circuit 208 or to comparator 212 in various embodiments.

In further embodiments, multiple comparators may be used in ASIC 203 to compare common mode signal CM to positive and negative thresholds and identify which backplate 222,224 is in contact with membrane 226 during pull-in. Alternatively, other approaches may be used to identify which backplate 222,224 is in contact with membrane 226. In various other embodiments, the elements of FIGS. 7a, 7b, and 7c may be recombined in different combinations and with other components by one of ordinary skill in the art. It is envisioned that all such variations are included within the scope of this disclosure.

Figure 8A:
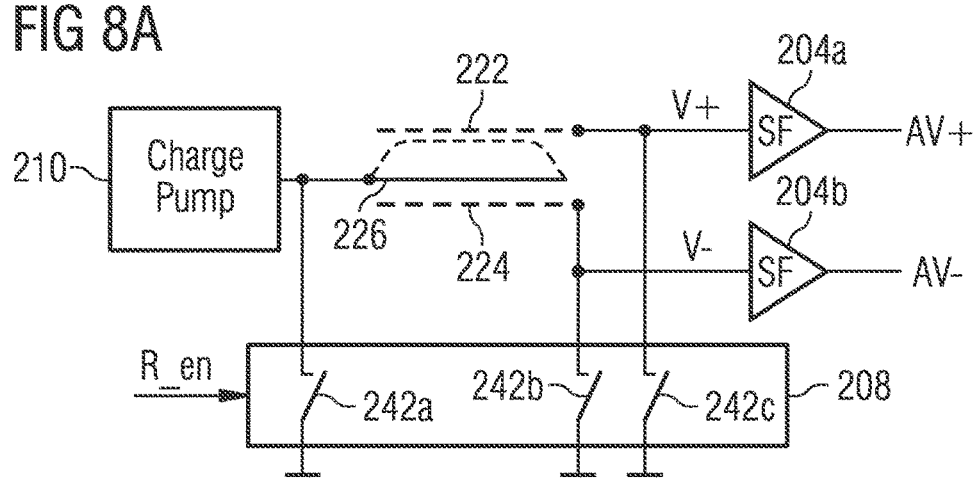
FIGS. 8a, 8b, and 8c illustrate circuit diagrams of embodiment pull-in repair circuits.
Figure 8B:
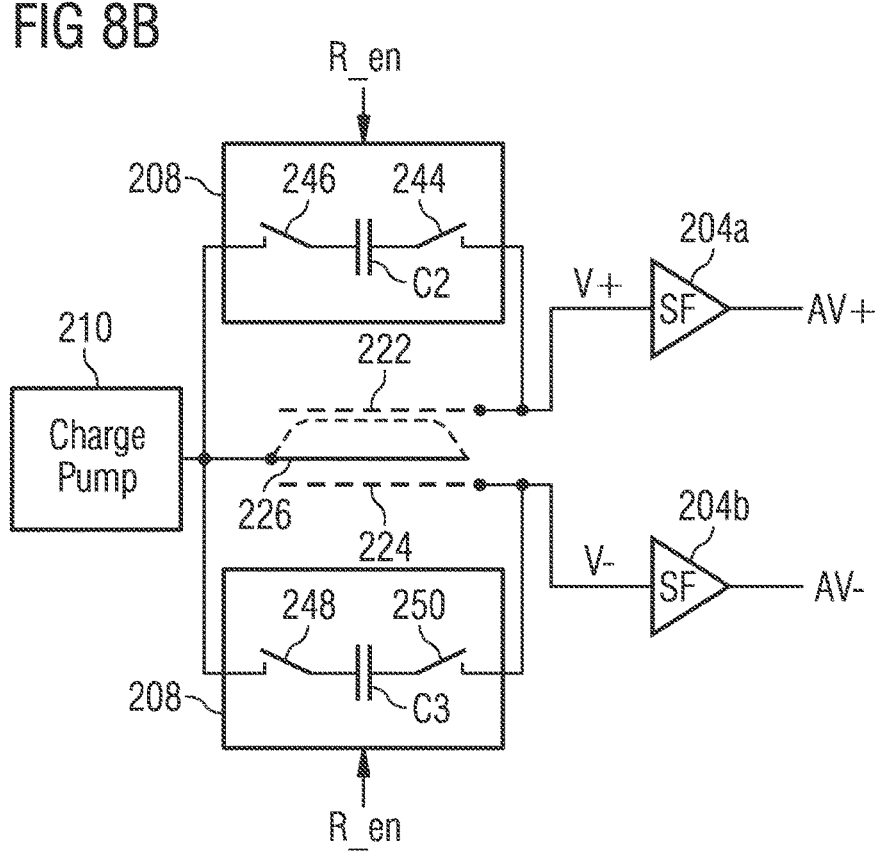
Figure 8C:
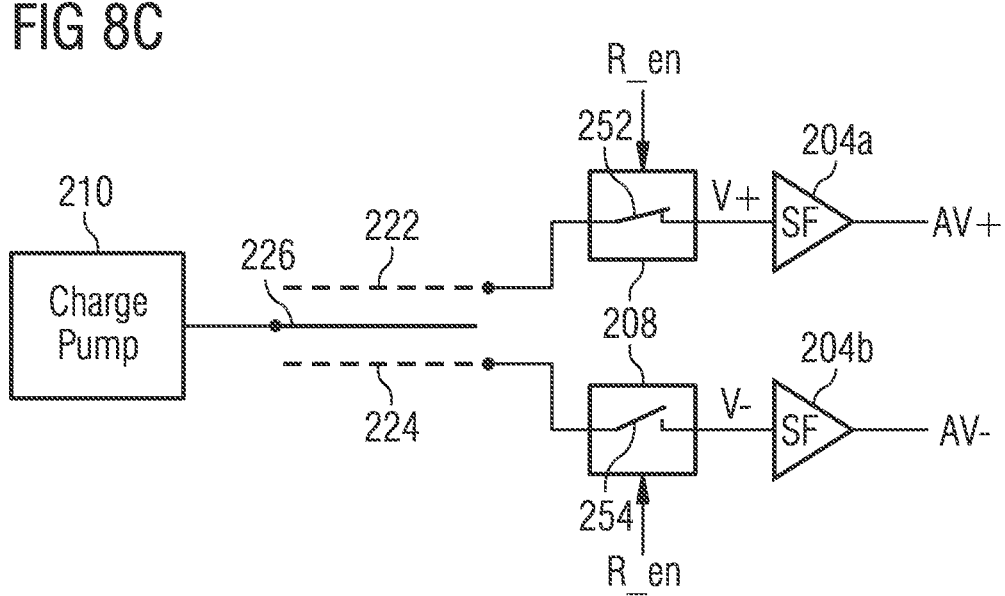

FIGS. 8a, 8b, and 8c illustrate circuit diagrams of embodiment pull-in repair circuits 108 or release circuit 208. According to one embodiment, FIG. 8a illustrates repair circuit 108 or release circuit 208 implemented as a reset circuit including switches 242a, 242b, and 242c coupled between membrane 226 and ground, backplate 224 and ground, and backplate 222 and ground, respectively, and controlled by release enable signal R_en. When asymmetric behavior is detected between voltages AV+ and AV− by the common mode measurement circuit 206 or pull-in detection circuit 106, as described above, release enable signal R_en is activated to close any of or all of switches 242a, 242b, and 242c. When switches 242a, 242b, and 242c are closed, they provide a conduction path to ground terminals, as shown, and discharge the charge stored on membrane 226, backplate 222, and backplate 224. Discharging membrane 226, backplate 222, and backplate 224 lowers the voltage between the membrane and either plate below pull-out voltage VP_out and causes the sticking plates to separate. In other embodiments, the ground terminals may be replaced with another reference supply voltage.

According to another embodiment, FIG. 8b illustrates repair circuit 108 or release circuit 208 implemented as a charge correction or charge balancing circuit including switches 244, 246, 248, and 250 as well as capacitors C2 and C3. Each of switches 244, 246, 248, and 250 may receive a control signal based on release enable signal R_en. When release enable signal R_en is activated, some or all of switches 244, 246, 248, and 250 are closed in order to form a conduction path through capacitor C2 or C3 that conducts between membrane 226 and either backplate 222 or backplate 224. As similarly described above in reference to FIG. 8a, conducting charge between the either backplate 222,224 and membrane 226 lowers the voltage between the membrane and either plate below pull-out voltage VP_out and causes the sticking plates to separate. Thus, the combination of switches 244, 246, 248, and 250 and capacitors C2 and C3 is able to balance or correct the charge on the plates in order to repair the sticking plates back to a normal operating point that exhibits symmetric output signals and equal sensitivity.

According to another embodiment, FIG. 8c illustrates repair circuit 108 or release circuit 208 implemented as a disconnect circuit including switches 252 and 254 coupled between top backplate 222 and amplifier 204a and between bottom backplate 224 and amplifier 204b. Switches 252 and 254 are controlled based on release enable signal R_en. In various embodiments, when release enable signal R_en is activated, corresponding to a detected pull-in or asymmetry in the differential output signal, switches 252 or 254 are opened in order to disconnect top backplate 222 or bottom backplate 224 from amplifiers 204a or 204b and any offset voltages (not shown, see FIG. 6, for example). When top and bottom backplates 222 and 224 are disconnected from amplifier 204a and 204b, the charge on the sticking plate leaks off causing the voltage between plates to decrease below the pull-out voltage. Thus, when switches 252 or 254 are opened for a certain period of time, the sticking plates separate and the dual backplate MEMS microphone returns to a normal operating point that exhibits symmetric output signals and equal sensitivity. According to various embodiments, elements of FIGS. 8a, 8b, and 8c may be interchanged and replaced. Such modifications are envisioned within the scope of this disclosure.

Figure 9:
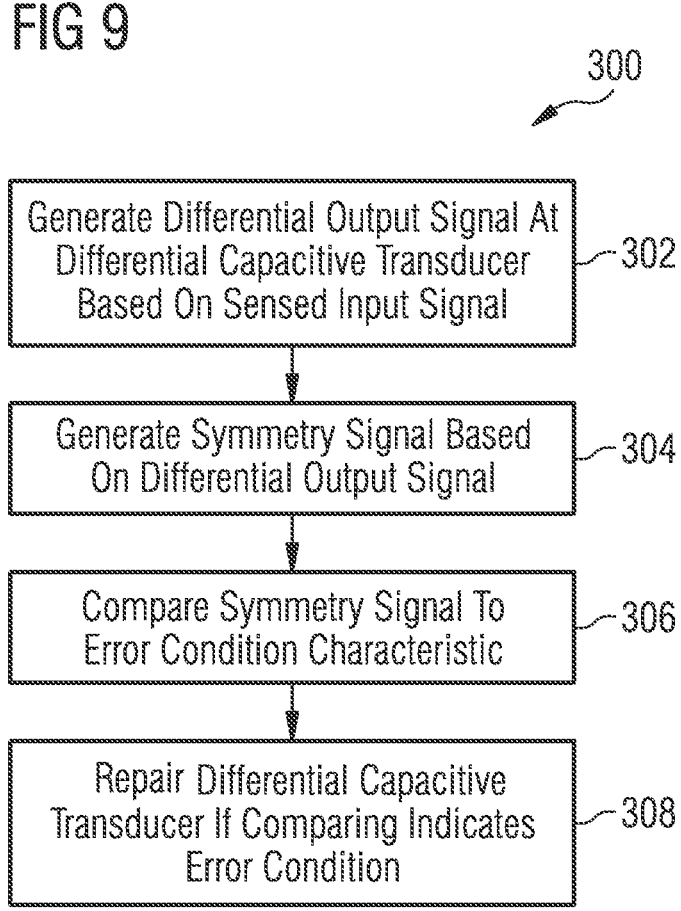
FIG. 9 illustrates a block diagram of an embodiment method of operation for a transducer system.

FIG. 9 illustrates a block diagram of an embodiment method of operation 300 for a transducer system including steps 302, 304, 306, and 308. According to various embodiments, step 302 includes generating a differential output signal at a differential capacitive transducer based on a sensed input signal. The differential capacitive transducer may be a dual backplate MEMS microphone and the sensed input signal may be an acoustic signal, for example. In other embodiments, the differential capacitive transducer may have two deflectable membranes and a single rigid backplate. The differential output signal is a differential electrical signal. In some embodiments the differential output signal is amplified during the generating in step 302.

In various embodiments, step 304 includes generating a symmetry signal based on the differential output signal. As described further herein above, the symmetry signal may be generated at a common mode measurement circuit or a symmetry detection circuit. In various embodiments, the symmetry signal may include the common mode signal or other features related to symmetry. Step 306 includes comparing the symmetry signal to an error condition characteristic. The error condition characteristic may be referred to as an alarm level or simply a comparison voltage V_comp, as described above in reference to FIG. 6. In some embodiments, the error condition characteristic may correspond to a specific level of asymmetry in the differential output signal. In a specific embodiment, the error condition characteristic is set to identify pull-in of capacitive plates in the differential capacitive transducer. In some embodiments, comparing the symmetry signal may include multiple comparisons to determine polarity of the asymmetry in order to identify which plates are exhibiting pull-in.

According to various embodiments, step 308 includes repairing the differential capacitive transducer if the comparing indicates an error condition. As determined in step 306, an error condition may correspond to pull-in of the capacitive plates. Repairing the differential capacitive transducer may include steps to redistribute or reset the charge on the capacitive plates in some embodiments. In other embodiments, repairing the differential capacitive transducer may include disconnecting the capacitive plates from bias sources until the charge on the capacitive plates is lowered. Repairing the differential capacitive transducer may include initiating a release protocol to separate sticking plates by lowering the charge on the sticking plates. In various embodiments, when the charge is lowered, the voltage across sticking plates decreases below the pull-out voltage and the sticking plates separate.

According to an embodiment, a transducer system includes a transducing element and a symmetry detection circuit coupled to a differential output of the transducer element. The transducing element includes a signal plate, a first sensing plate, and a second sensing plate. The symmetry detection circuit is configured to output an error signal based on asymmetry in the differential output.

In various embodiments, the signal plate is a membrane, the first sensing plate is a first backplate, and the second sensing plate is a second backplate. In other embodiments, the signal plate is a backplate, the first sensing plate is a first membrane, and the second sensing plate is a second membrane. The first sensing plate and the second sensing plate may be formed adjacent to the signal plate on opposite sides and are each spaced a first distance from the signal plate.

In various embodiments, the symmetry detection circuit includes a resistive divider connected between positive and negative output terminals supplying the differential output. The symmetry detection circuit may also include a filter coupled to the resistive divider. The symmetry detection circuit may still further include a first adder coupled to the positive and negative output terminals, a first logarithmic amplifier coupled to the filter, a second logarithmic amplifier coupled to an output of the first adder and configured to receive a first difference, and a second adder coupled to the first logarithmic amplifier and the second logarithmic amplifier. In such embodiments, the first adder is configured to calculate the first difference from signals on the positive and negative output terminals and the second adder is configured to calculate a second difference from outputs of the first logarithmic amplifier and the second logarithmic amplifier.

In various embodiments, the transducer system further includes a repair circuit coupled to the transducer element and the symmetry detection circuit. The repair circuit may be configured to alter a charge level on the signal plate, the first sensing plate, or the second sensing plate based on the error signal. In some embodiments, the repair circuit includes a first reset switch coupled between the signal plate and a low reference supply, a second reset switch coupled between the first sensing plate and the low reference supply, and a third reset switch coupled between the second sensing plate and the low reference supply. The first, second, and third reset switches may be controlled based on the error signal. In some embodiments, the repair circuit includes a first charge distribution unit having a first terminal coupled to the signal plate and a second terminal coupled to the first sensing plate and a second charge distribution unit having a first terminal coupled to the signal plate and a second terminal coupled to the second sensing plate. The first charge distribution unit is configured to receive the error signal and the second charge distribution unit is configured to receive the error signal. In such embodiments, the first charge distribution unit and the second charge distribution unit each include a first switch, a capacitor, and a second switch coupled in series between the first terminal and the second terminal of the respective charge distribution unit. The first switch and second switch in both the first charge distribution unit and the second charge distribution unit may be switched based on the error signal. In some embodiments, the repair circuit includes a first disconnect switch coupled between the first sensing plate and additional processing circuits and a second disconnect switch coupled between the second sensing plate and the additional processing circuits. The first disconnect switch and the second disconnect switch are controlled based on the error signal.

In various embodiments, the transducer system includes a bias circuit coupled to the signal plate, a first amplifier coupled between the first sensing plate and a first terminal of the differential output, and a second amplifier coupled between the second sensing plate and a second terminal of the differential output. In some embodiments, the transducer element, the first amplifier, and the second amplifier are disposed on a same integrated circuit.

According to an embodiment, a method of operating a transducer system includes generating a differential output signal at a differential capacitive transducer based on a sensed input signal, generating a symmetry signal based on the differential output signal, comparing the symmetry signal to an error condition characteristic, and repairing the differential capacitive transducer if the comparing indicates an error condition.

In various embodiments, repairing the differential capacitive transducer includes coupling a capacitive plate of the differential capacitive transducer to a ground connection. In some embodiments, repairing the differential capacitive transducer includes adjusting a voltage on a capacitive plate of the differential capacitive transducer below a pull-out voltage. In further embodiments, repairing the differential capacitive transducer includes disconnecting a capacitive plate of the differential capacitive transducer from an output circuit.

In various embodiments, generating the symmetry signal includes generating a common mode signal based on the differential output signal. In such embodiments, the method may also include filtering the common mode signal. In some embodiments, generating the symmetry signal includes generating a difference signal between a first component and a second component of the differential output signal, generating a common mode signal based on the differential output signal, and determining a ratio of the difference signal to the common mode signal. In a specific embodiment, the symmetry signal is proportional to the logarithmic equation $\log(D1-D2)-\log(CM)$, where D1 is the first component of the differential output signal, D2 is the second component of the differential output signal, and CM is the common mode signal.

According to an embodiment, a microphone system includes a dual backplate MEMS microphone and an interface circuit. The dual backplate MEMS microphone includes a first backplate, a second backplate, a membrane formed between the first backplate and the second backplate, a first output terminal coupled to the first backplate, and a second output terminal coupled to the second backplate. The interface circuit includes a first amplifier coupled to the first output terminal, a second amplifier coupled to the second output terminal, a symmetry detection circuit coupled to outputs of the first amplifier and the second amplifier and including a symmetry signal terminal, a comparator coupled to the symmetry signal terminal and an asymmetry threshold input and including a release enable output, and a release circuit coupled to the release enable output and the membrane. The release circuit is configured to provide a release control signal to the membrane based on signals received from the release enable output.

In various embodiments, the symmetry detection circuit includes a resistive divider coupled between outputs of the first amplifier and the second amplifier, and a capacitor coupled to an intermediate node of the resistive divider. In some embodiments, the symmetry detection circuit includes a first adder coupled to the outputs of the first amplifier and the second amplifier, a first logarithmic amplifier coupled to the capacitor, a second logarithmic amplifier coupled to an output of the first adder and configured to receive a first difference, and a second adder coupled to the first logarithmic amplifier and the second logarithmic amplifier. The first adder is configured to calculate the first difference from signals on the outputs of the first amplifier and the second amplifier and the second adder is configured to calculate a second difference from outputs of the first logarithmic amplifier and the second logarithmic amplifier.

In various embodiments, the release circuit includes a plurality of switches controlled based on the signals received from the release enable output. In such embodiments, each switch is coupled to the first backplate, the second backplate, or the membrane and the switches are configured to adjust a charge level on the first backplate, the second backplate, or the membrane. In some embodiments, the first backplate, the second backplate, the membrane, the first amplifier, and the second amplifier are disposed on a same integrated circuit.

According to an embodiment, advantages may include operating differential capacitive transducers with a higher sensitivity, simple detection of error conditions in differential capacitive transducers, and simple repair of error conditions in differential capacitive transducers.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A transducer system comprising:
a transducer element comprising a signal plate, a first sensing plate, and a second sensing plate; and
a symmetry detection circuit coupled to a differential output of the transducer element, the symmetry detection circuit configured to determine a common mode component of the differential output, generate a first difference signal between a first component and a second component of the differential output, determine a ratio of the first difference signal to the common mode component, produce an error signal based on the determined ratio and activate a repair circuit configured to repair a pull-in condition of the transducer element when the error signal exceeds a predetermined value.

2. The transducer system of claim 1, wherein:
the signal plate is a membrane,
the first sensing plate is a first backplate, and
the second sensing plate is a second backplate.

3. The transducer system of claim 1, wherein:
the signal plate is a backplate,
the first sensing plate is a first membrane, and
the second sensing plate is a second membrane.

4. The transducer system of claim 1, wherein the first sensing plate and the second sensing plate are formed adjacent to the signal plate on opposite sides and are each spaced a first distance from the signal plate.

5. The transducer system of claim 1, wherein the symmetry detection circuit comprises a resistive divider connected between positive and negative output terminals supplying the differential output.

6. The transducer system of claim 5, wherein the symmetry detection circuit further comprises a filter coupled to the resistive divider.

7. The transducer system of claim 6, wherein the symmetry detection circuit further comprises:
- a first adder coupled to the positive and negative output terminals, the first adder configured to calculate the first difference signal from signals on the positive and negative output terminals;
- a first logarithmic amplifier coupled to the filter;
- a second logarithmic amplifier coupled to an output of the first adder and configured to receive the first difference signal; and
- a second adder coupled to the first logarithmic amplifier and the second logarithmic amplifier, the second adder configured to calculate a second difference signal from outputs of the first logarithmic amplifier and the second logarithmic amplifier.

8. The transducer system of claim 1, further comprising the repair circuit coupled to the transducer element and the symmetry detection circuit, the repair circuit configured to alter a charge level on the signal plate, the first sensing plate, or the second sensing plate based on the error signal, wherein the altered charge level is configured to repair the pull-in condition of the transducer element.

9. The transducer system of claim 8, wherein the repair circuit comprises:
- a first reset switch coupled between the signal plate and a low reference supply;
- a second reset switch coupled between the first sensing plate and the low reference supply; and
- a third reset switch coupled between the second sensing plate and the low reference supply, wherein the first, second, and third reset switches are controlled based on the error signal.

10. The transducer system of claim 8, wherein the repair circuit comprises:
- a first charge distribution unit having a first terminal coupled to the signal plate and a second terminal coupled to the first sensing plate, wherein the first charge distribution unit is configured to receive the error signal; and
- a second charge distribution unit having a first terminal coupled to the signal plate and a second terminal coupled to the second sensing plate, wherein the second charge distribution unit is configured to receive the error signal.

11. The transducer system of claim 10, wherein the first charge distribution unit and the second charge distribution unit each comprise a first switch, a capacitor, and a second switch coupled in series between the first terminal and the second terminal of the respective charge distribution unit, and wherein the first switch and second switch in both the first charge distribution unit and the second charge distribution unit are switched based on the error signal.

12. The transducer system of claim 8, wherein the repair circuit comprises:
- a first disconnect switch coupled between the first sensing plate and additional processing circuits; and
- a second disconnect switch coupled between the second sensing plate and the additional processing circuits, wherein the first disconnect switch and the second disconnect switch are controlled based on the error signal.

13. The transducer system of claim 1, further comprising:
a bias circuit coupled to the signal plate;
a first amplifier coupled between the first sensing plate and a first terminal of the differential output; and
a second amplifier coupled between the second sensing plate and a second terminal of the differential output.

14. The transducer system of claim 13, wherein the transducer element, the first amplifier, and the second amplifier are disposed on a same integrated circuit.

15. A method of operating a transducer system, the method comprising:
- generating a differential output signal at a differential capacitive transducer based on a sensed input signal;
- determining a common mode signal of the differential output signal;
- generating a symmetry signal based on the determined common mode signal, generating the symmetry signal comprising generating a difference signal between a first component and a second component of the differential output signal, and determining a ratio of the difference signal to the common mode signal;
- comparing the symmetry signal to an error condition characteristic; and
- repairing a pull-in condition of the differential capacitive transducer if the comparing indicates an error condition.

16. The method of claim 15, wherein repairing the differential capacitive transducer comprises coupling a capacitive plate of the differential capacitive transducer to a ground connection.

17. The method of claim 15, wherein repairing the differential capacitive transducer comprises adjusting a voltage on a capacitive plate of the differential capacitive transducer below a pull-out voltage.

18. The method of claim 15, wherein repairing the differential capacitive transducer comprises disconnecting a capacitive plate of the differential capacitive transducer from an output circuit.

19. The method of claim 15, further comprising filtering the common mode signal.

20. The method of claim 15, wherein the symmetry signal is proportional to a logarithmic equation:

$$\log(D1-D2)-\log(CM), \text{ wherein}$$

D1 is the first component of the differential output signal,
D2 is the second component of the differential output signal, and
CM is the common mode signal.

21. A microphone system comprising:
a dual backplate MEMS (microelectromechanical system) microphone comprising:
- a first backplate,
- a second backplate,
- a membrane formed between the first backplate and the second backplate,
- a first output terminal coupled to the first backplate, and
- a second output terminal coupled to the second backplate; and
an interface circuit comprising:
- a first amplifier coupled to the first output terminal,
- a second amplifier coupled to the second output terminal,
- a symmetry detection circuit coupled to outputs of the first amplifier and the second amplifier, the symmetry detection circuit configured to determine a common mode component of a signal of the first output terminal and a signal of the second output terminal and produce a signal symmetry signal at a symmetry signal terminal based on the determined common mode component, wherein the symmetry detection circuit comprises a resistive divider coupled between outputs of the first amplifier and the second amplifier, and a capacitor coupled to an intermediate node of the resistive divider, a comparator coupled to the symmetry signal terminal and an asymmetry threshold input and comprising a release enable output, and a release circuit coupled to the release enable output, and to the first backplate, or the second backplate, the release circuit configured to repair a pull-in condition of MEMS microphone by providing a release control signal to the first backplate or the second backplate based on signals received from the release enable output.

22. The microphone system of claim 21, wherein the symmetry detection circuit further comprises:
   a first adder coupled to the outputs of the first amplifier and the second amplifier, the first adder configured to calculate a first difference from signals on the outputs of the first amplifier and the second amplifier;
   a first logarithmic amplifier coupled to the capacitor;
   a second logarithmic amplifier coupled to an output of the first adder and configured to receive the first difference; and
   a second adder coupled to the first logarithmic amplifier and the second logarithmic amplifier, the second adder configured to calculate a second difference from outputs of the first logarithmic amplifier and the second logarithmic amplifier.

23. The microphone system of claim 21, wherein the release circuit comprises a plurality of switches controlled based on the signals received from the release enable output, each switch coupled to the first backplate or the second backplate, and wherein the switches are configured to adjust a charge level on the first backplate, the second backplate, or the membrane.

24. The microphone system of claim 21, wherein the first backplate, the second backplate, the membrane, the first amplifier, and the second amplifier are disposed on a same integrated circuit.

25. The microphone system of claim 21, further comprising a further comparator coupled to the symmetry signal terminal and a further asymmetry threshold input.

26. A system comprising:
   a transducer element comprising a signal plate, a first sensing plate, and a second sensing plate; and
   a symmetry detection circuit coupled to a coupled to a differential output of the transducer element, the symmetry detection circuit configured to output an error signal based on asymmetry in the differential output, wherein the symmetry detection circuit comprises
      a resistive divider connected between positive and negative output terminals supplying the differential output,
      a filter coupled to the resistive divider,
      a first adder coupled to the positive and negative output terminals, the first adder configured to calculate a first difference from signals on the positive and negative output terminals;
      a first logarithmic amplifier coupled to the filter,
      a second logarithmic amplifier coupled to an output of the first adder and configured to receive the first difference, and
      a second adder coupled to the first logarithmic amplifier and the second logarithmic amplifier, the second adder configured to calculate a second difference from outputs of the first logarithmic amplifier and the second logarithmic amplifier.

* * * * *